United States Patent [19]

Smith

[11] Patent Number: 4,744,396

[45] Date of Patent: May 17, 1988

[54] APPARATUS FOR COMMINUTING TREE STUMPS

[76] Inventor: Ralph W. Smith, 5101 S. Grand Circle Ter., Homosassa, Fla. 32646

[21] Appl. No.: 64,235

[22] Filed: Jun. 19, 1987

[51] Int. Cl.⁴ .......................................... A01G 23/06
[52] U.S. Cl. .................................... 144/2 N; 37/2 R; 241/101.7
[58] Field of Search ...................... 56/17.1, 17.2, 119; 37/2 R; 30/379, 379.5; 144/2 N; 241/101.7

[56] References Cited

U.S. PATENT DOCUMENTS

| | | | |
|---|---|---|---|
| 1,312,450 | 8/1919 | McKoy et al. | 144/2 N |
| 2,912,022 | 11/1959 | Ver Ploeg et al. | 144/2 |
| 3,044,509 | 7/1962 | Kehler | 144/2 |
| 3,198,224 | 8/1965 | Hiley | 144/2 |
| 3,308,860 | 3/1967 | DeShano | 144/2 |
| 3,336,958 | 8/1967 | Carlton | 144/2 |
| 3,625,267 | 12/1971 | Welborn | 144/2 N |
| 3,685,557 | 8/1972 | Groce | 144/2 N |
| 3,732,905 | 5/1973 | Pickel | 144/2 Z |
| 3,868,980 | 3/1975 | Blum | 144/2 N |
| 4,271,879 | 6/1981 | Shivers, Jr. et al. | 144/2 N |
| 4,402,352 | 9/1983 | Hodges | 144/2 N |
| 4,530,385 | 7/1985 | York | 144/2 N |
| 4,690,183 | 9/1987 | Eilertson | 144/2 N |

Primary Examiner—W. Donald Bray

[57] ABSTRACT

Apparatus for comminuting tree stumps, the apparatus includes a vehicle having a flat bed portion, rails disposed on the flat bed portion, a frame slidably disposed on the rails, slide power means to move the frame on the rails, an arm pivotally mounted on the frame, a cutter wheel mounted on the arm, a handle mounted proximate a free end of the arm, and slide power switch means mounted on the arm proximate the handle and operable to activate the slide power means to move the frame on the rails.

10 Claims, 8 Drawing Sheets

APPARATUS FOR COMMINUTING TREE STUMPS

BACKGROUND OF THE INVENTION

1. Field of the Invention

This invention relates to an improved apparatus for comminuting tree stumps in the ground.

2. Description of the Prior Art

In land clearing operations, tree stumps remaining after felling trees may be pulled out of the ground and left at the site to decompose, or removed to a dump area. Alternatively, the stumps may be burned at the site or at the dump area. Such solutions often run afoul of environmental concerns, making it attractive to comminute the stumps in the ground.

A host of machines have been devised to comminute tree stumps in the ground. Those with which Applicant is familiar are complex and very expensive, making them prohibitively costly from a purchase standpoint, and in most cases even from a rental or one-time use standpoint.

SUMMARY OF THE INVENTION

An object of the present invention is to provide a comminuting apparatus which may be used in conjunction with commonly available and inexpensive vehicles and which is of relatively simple and inexpensive construction.

A further object of the invention is to provide such apparatus as may be operated by a single operator from a position adjacent the stump being comminuted.

With the above and other objects in view, as will hereinafter appear, a feature of the present invention is the provision of apparatus for comminuting tree stumps in the ground, the apparatus comprising a vehicle having a substantially flat bed portion, rails disposed on the bed portion, ball bearings mounted on the rails, frame means slidably disposed on the rails and in contact with the ball bearings, slide power means mounted on the apparatus and adapted to move the frame means on the rails, an arm mounted on the frame means and adapted for pivotal movement, a rotatable cutter wheel mounted on the arm, handle means mounted proximate a free end of the arm, cutter power switch means mounted on the apparatus and operative to activate cutter power means mounted on the frame to operate drive means connected to the cutter wheel to turn the cutter wheel, and slide power switch means mounted on the arm proximate the handle means and operative to activate the slide power means to move the frame means on the rails, whereby an operator may from a position proximate the cutter wheel, energize the cutter power means, energize the slide power means to extend the cutter wheel toward the tree stump, and by manipulation of the slide power means and the pivotally mounted arm by way of the handle, selectively engage the cutter wheel with the stump.

The above and other features of the invention, including various novel details of construction and combination of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENT

Figure 2:
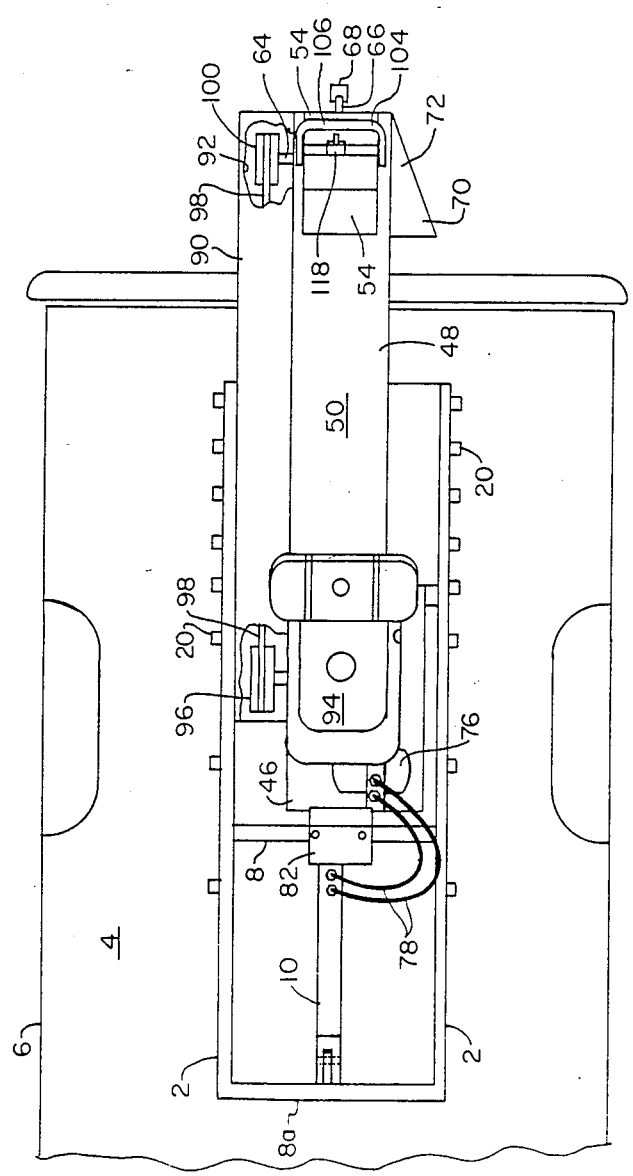
FIG. 2 is a top plan view of the apparatus, showing the apparatus in its transport and/or "at rest" position.

Referring to the drawings, it will be seen that the illustrative apparatus includes a pair of parallel rails 2 fixed to a flat bed portion 4 (FIG. 2) of a vehicle 6, preferably a motorized self-propelled vehicle, such as a pick-up truck.

The rails 2 may be interconnected by beams 8 (FIG. 1), including an end beam 8a to which is fixed a hydraulic cylinder rod 12. The rod 12 extends from a cylinder 10 which is connected to a frame means 14 comprising two parallel legs 16 interconnected by a head portion 18 to which the cylinder 10 is secured. The rails 2 are provided with ball bearings 20. The frame means legs 16 are slidably disposed in the rails 2 and on the ball bearings 20, to enable the frame means 14 to slide forwardly and rearwardly in the rails 2 with ease, in response to movement of the cylinder 10 on the rod 12.

Fixed to the frame means head portion 18 is a bracket 22 having first and second flanges 24, 26 having, respectively, aligned holes 28, 30. The holes 28, 30 are adapted to receive a trunk portion 32 of a T-shaped rod 34, the rod trunk portion 32 being rotatable in the holes 28, 30.

The head portion 36 of the T-shaped rod 34 is disposed in aligned holes 38, 40 of bracket members 42, 44 which depend from an arm assembly 48.

Extending rearwardly and downwardly from a base plate portion 46 of the arm assembly 48 is an arm plate 50. At the free end of the arm plate 50 there is a recess 52 (FIG. 1) having disposed thereover a cover portion 54 upstanding from the arm plate 50. Attached to the underside of the arm plate 50 are a pair of brackets 56, 58 having therein aligned holes 60, 62 in which is disposed a rod 64. A cutter wheel 66, having thereon detachable cutter elements 68, is mounted on the rod 64. Fixed to the arm plate 50 proximate the cutter wheel 66 is a shield 70 having a first portion 72 substantially coplanar with the arm plate 50 and a second portion 74 depending from a rearward edge of the first portion 72. The shield 70 confines the dispersion of wood chips during a comminuting operation.

On the base plate 46; there is mounted a slide power means 76 comprising a motor and pump assembly having hydraulic lines 78 interconnecting with the aforementioned cylinder 10. A battery tray 80 is also mounted on the base plate portion 46 and is adapted to retain an automotive battery 82 (FIG. 5).

Figure 1:
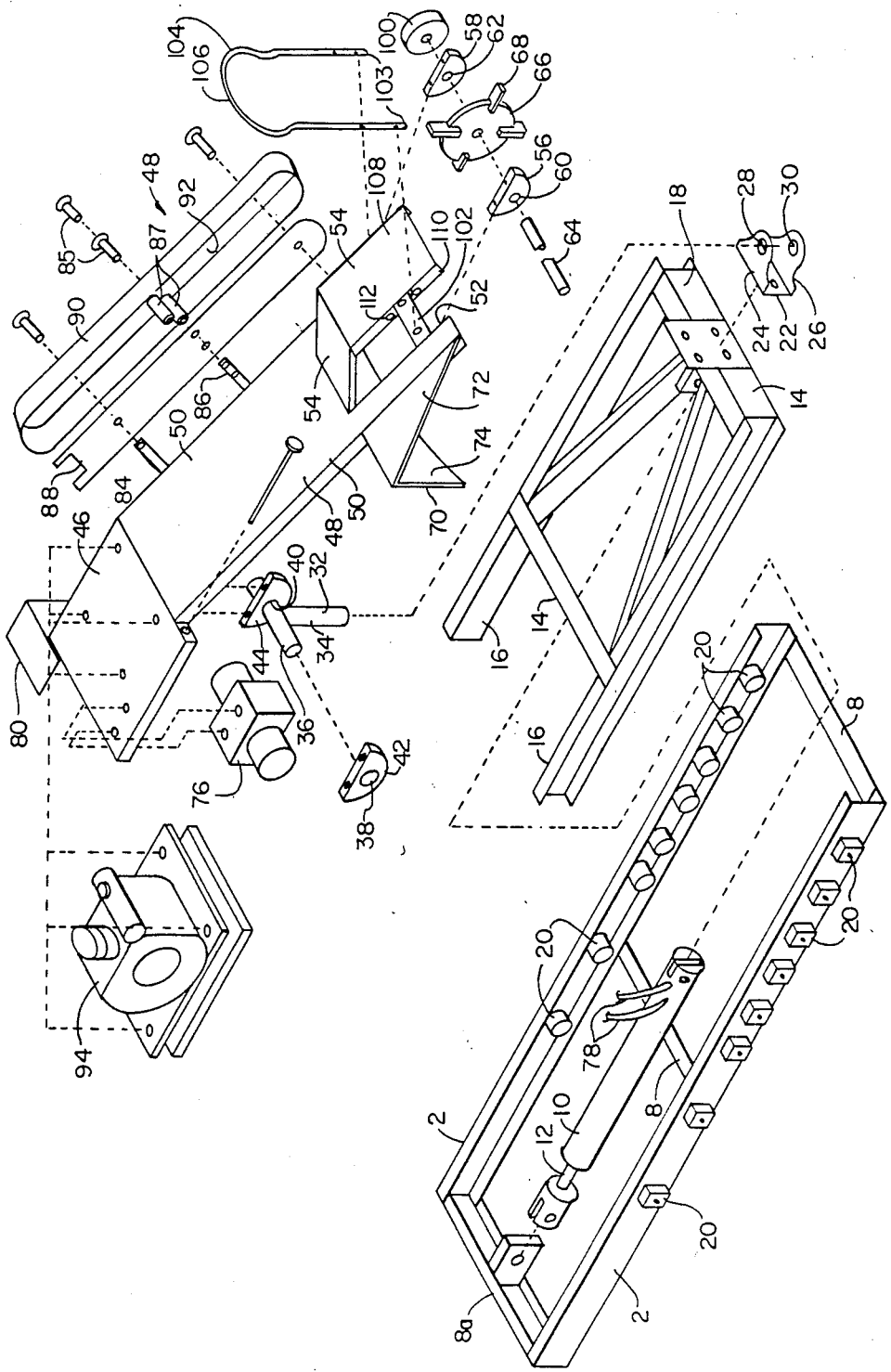
FIG. 1 is an exploded perspective view of one form of comminuting apparatus illustrative of an embodiment of the invention.
Figure 5:
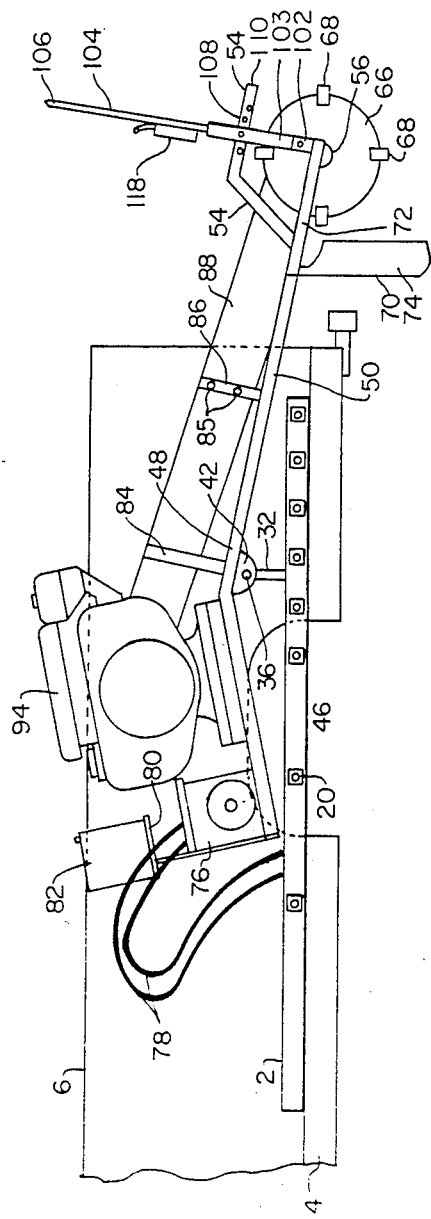
FIG. 5 is a side elevational view of the apparatus, showing the apparatus in the position illustrated in FIG. 2.
Figure 7:
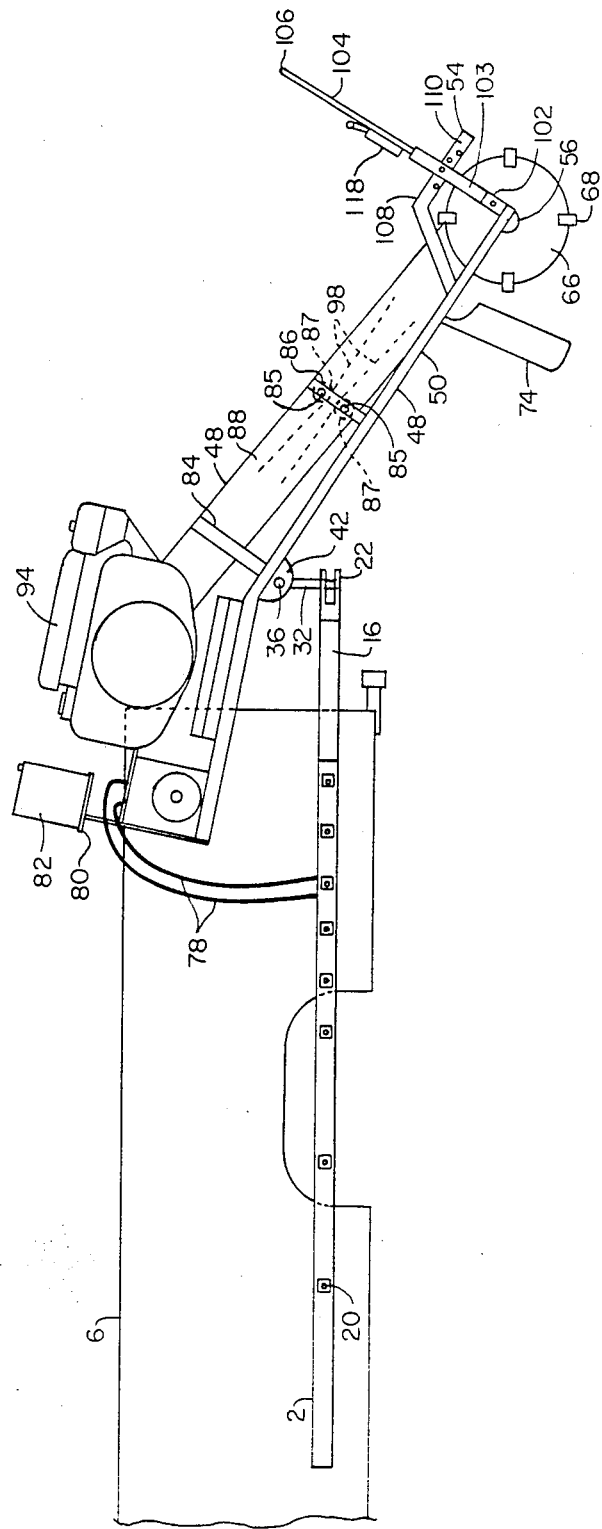
FIG. 7 is a side elevational view of the apparatus, similar to FIG. 6, but showing portions of the apparatus in an alternative operating position.

The arm plate 50 has upstanding therefrom bracket members 84, 86 (FIGS. 1 and 5). To the bracket member 84 there is attached a panel member 88 and a cover member 90, the panel member and cover member 88, 90 defining therebetween an elongated chamber 92 (FIG. 1). The bracket member 86 supports upper and lower pins 85 on which are mounted roller bearings 87. On the base plate portion 46, there is mounted cutter power means in the form of a motor 94 (FIG. 5) having a drive wheel 96 (FIG. 2) thereon. A drive belt 98 is mounted on the wheel 96 and also on a wheel 100 fixed to the rod 64. The drive belt passes between the roller bearings 87 (FIG. 7). The drive belt 98, and the wheels 96, 100 are housed in the chamber 92.

Figure 8:
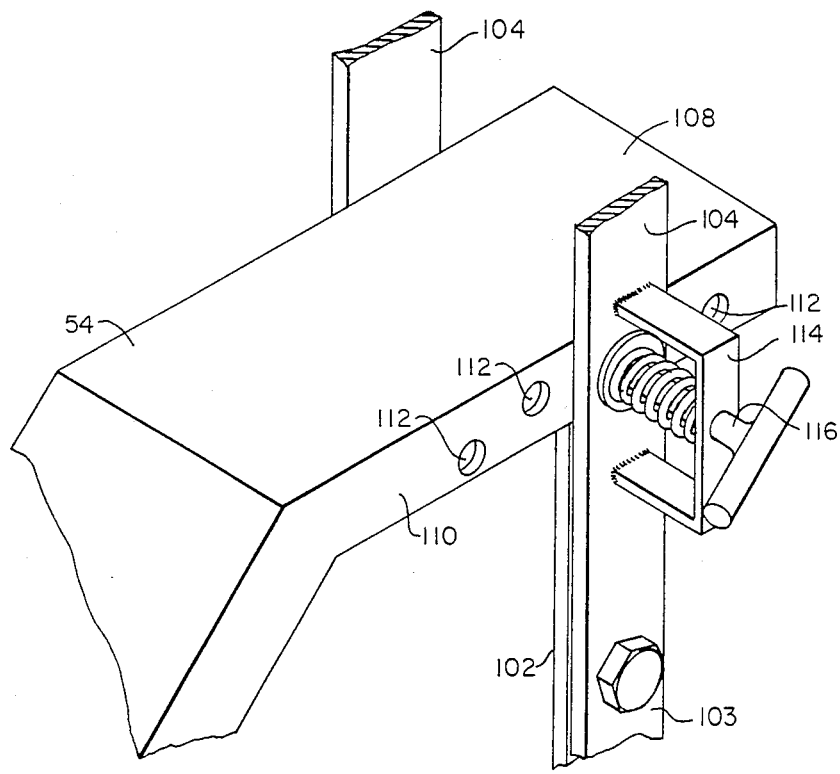
FIG. 8 is an enlarged perspective view of a handle portion of the assembly.

Upstanding from either side of the arm plate 50 on either side of the recess 52, are a pair of flanges 102 to which are pivotally secured the ends 103 of a generally U-shaped handle 104 having a loop portion 106. The cover portion 54 of the arm assembly 48 includes an upper portion 108 having side flanges 110 (FIG. 8). The side flanges 110 are provided with a series of holes 112 disposed arcuatly relative to the pivot juncture of the flanges 102 and handle ends 103. Attached to the handle 104, near one end thereof, is a bracket 114 on which is mounted a spring-biased plunger 116 which passes through a hole in the handle 104 and is adapted to pass into a selected one of the holes 112 in the cover upper portion 108, to selectively position the handle 104 and retain the handle in the selected attitude.

Mounted on the handle 104 is a slide power switch means 118 which is operative to energize the slide power means 76 to selectively move the frame means 14, and therefore the cutter wheel 66, forwardly or rearwardly, as desired.

Mounted on the frame means 14, usually on or adjacent to the cutter power means or motor 94, is a cutter power switch means (not shown), typically key operated, adapted to energize the motor 94 to turn the drive wheel 96 and thereby the wheel 100 and cutter wheel 66.

Preferably, mechanical lock means (not shown) are utilized to lock the arm in place during travel, and the like, to prevent pivoting movement thereof. In like manner, a mechanical lock (not shown) may be used to lock the frame means in place on the rails to prevent sliding forwardly and/or rearwardly during transport.

Figure 3:
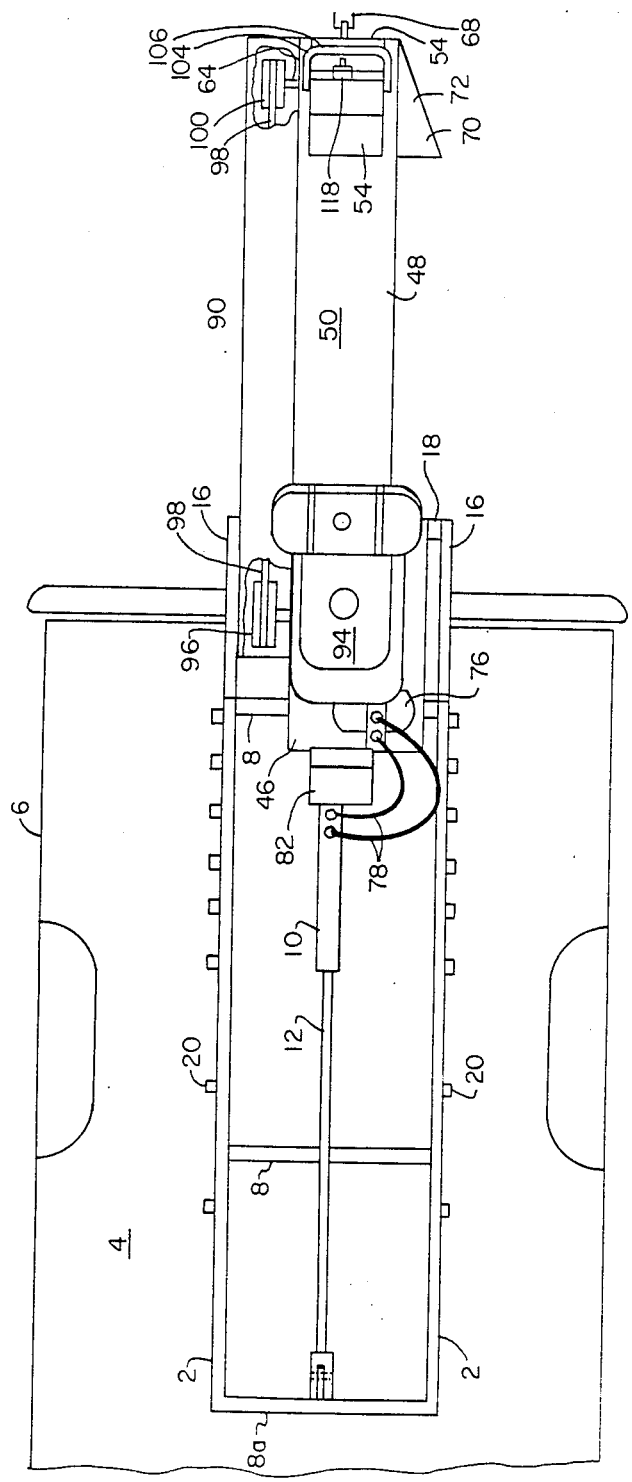
FIG. 3 is a top plan view of the apparatus, similar to FIG. 2, but showing portions of the apparatus in their operative position.
Figure 4:
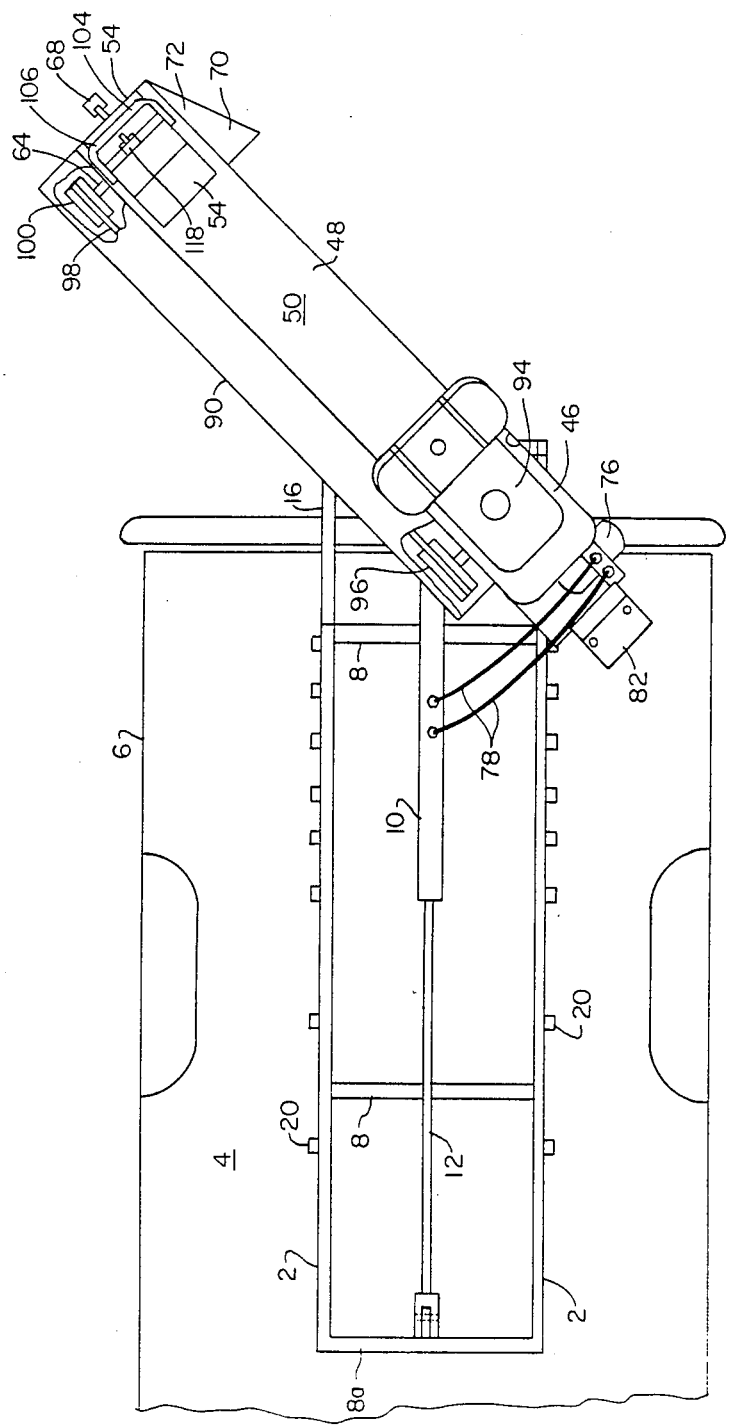
FIG. 4 is a top plan view of the apparatus, similar to FIG. 3, but showing portions of the apparatus in an alternative operating position.
Figure 6:
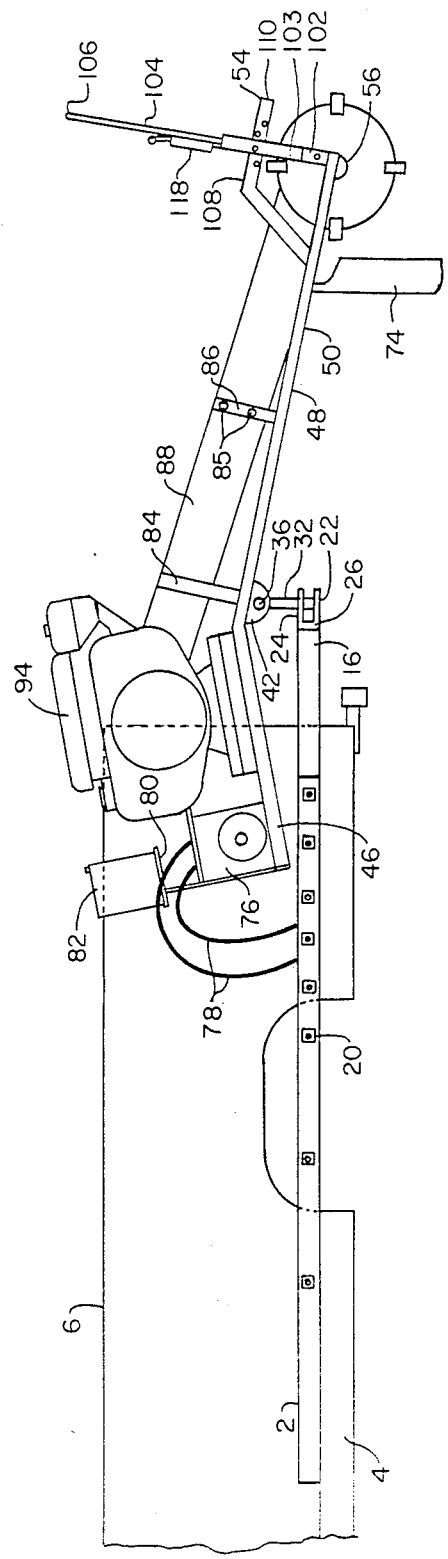
FIG. 6 is a side elevational view of the apparatus, showing the apparatus in the position illustrated in FIG. 3.

In operation, the vehicle 6 is backed up close to an in-ground tree stump to be comminuted. The operator, standing near the arm assembly 48 turns the cutter power switch to the "on" position, which activates the motor 94 to turn the drive wheel 96 (FIG. 2) and thereby the cutter wheel 66. The operator then turns the slide power switch 118 to "extend" to energize the slide power means 76 to pump hydraulic fluid to the cylinder 10 to force the frame means 14 rearwardly. By selective use of the switch 118, the operator may extend the arm assembly 48 rearwardly (FIGS. 3 and 6) to bring the cutter wheel 66 to the nearest portion of the stump. By use of the handle 104, the operator may pivotally move the cutter wheel downwardly (FIG. 7) onto the stump and then pivotally move the cutter wheel side to side (FIG. 4) to comminute with each pass a portion of the stump.

Given the different sizes, shapes and locations of tree stumps, it is often desirable that the handle position be changed for a particular job, or even during a job. To change the attitude of the handle, the operator draws the plunger 116 (FIG. 8) from the flange 110, against the spring bias of the plunger, and moves the handle until the plunger aligns with an appropriate hole 112. Upon release of the plunger, it carriers into the selected hole 112 under spring pressure and locks the handle in the selected position.

Upon completion of a comminuting operation, the operator turns the slide power switch 118 to "retract", which reverses the operation of the cylinder 10 to pull the frame means 14 forwardly, the arm 48 being guided by the operator's hand on the handle 104. When the frame means 14 has reached its forward-most position (FIGS. 2 and 5), the operator turns the cutter power switch to the "off" position, to stop the motor 94 and thereby the cutter wheel 66. Any aforementioned mechanical locks are then placed in locking positions to secure the apparatus for transport.

It is to be understood that the present invention is by no means limited to the particular construction herein disclosed and/or shown in the drawings, but also comprises any modification or equivalents within the scope of the disclosure. For example, if desired, the cutter power switch may be placed in the vicinity of the slide power switch on the handle, so that the operator has all the controls within easy reach while in a comminuting operation.

Having thus described my invention, what I claim as new and desire to secure by Letters Patent of the United States is:

1. An apparatus for comminuting tree stumps, the apparatus comprising a vehicle having a substantially flat bed portion, rails disposed on said bed portion, ball bearings mounted on said rails, frame means slidably disposed on said rails and in contact with said ball bearings, slide power means mounted on said apparatus and adapted to move said frame means on said rails, an arm mounted on said frame means and adapted for pivotal movement, a rotatable cutter wheel mounted on said arm, handle means mounted proximate a free end of said arm, cutter power switch means mounted on said apparatus and operative to activate cutter power means mounted on said frame to operate drive means connected to said cutter wheel to turn said cutter wheel, and slide power switch means mounted on said arm proximate said handle means and operative to activate said slide power means to move said frame means on said rails, whereby an operator may from a position proximate said cutter wheel, energize said cutter power means, energize said slide power means to extend said cutter wheel toward said tree stump, and by manipulation of said slide power means and said pivotally mounted arm by way of said handle, selectively engage said cutter wheel with said stump.

2. The apparatus in accordance with claim 1 in which said vehicle is motorized and self-propelled.

3. The apparatus in accordance with claim 1 in which said rails are parallel and U-shaped and leg portions of said frame means are slidably disposed in said rails.

4. The apparatus in accordance with claim 3 in which said slide power means comprises power cylinder means.

5. The apparatus in accordance with claim 1 in which said arm is mounted on said frame means and adapted for pivotal movement horizontally and vertically.

6. The apparatus in accordance with claim 5 in which said handle means are mounted on and upstanding from a distal end of said arm proximate said cutter wheel.

7. An apparatus for comminuting tree stumps, the apparatus comprising a motorized self-propelled vehicle having a substantially flat bed portion, two parallel rails disposed on said bed portion and extending in forwardly and rearwardly directions relative to said vehicle, ball bearings mounted on said rails, frame means slidingly disposed on said rails and adapted for contact with said ball bearings, power cylinder means fixed to said vehicle and adapted to move said frame means forwardly and rearwardly on said rails, an arm mounted on said frame means and adapted for pivotal movement horizontally and vertically, a rotatable cutter wheel mounted on a distal end of said arm, handle bar means mounted on and upstanding from said distal end of said arm proximate said cutter wheel, slide power switch means mounted on said arm proximate said handle bar means and operative to activate said power cylinder, and cutter power switch means mounted on said apparatus proximate said handle bar means when said frame is in a forward-most position, said cutter power switch means being operative to activate cutter power means mounted on said frame means to operate belt drive means conneced to said cutter wheel to turn said cutter wheel, whereby an operator stationed proximate said distal end may operate said slide power switch means to move said cutter wheel forwardly and rearwardly and by manipulation of said handle bar means may move said cutter wheel in side to side and in vertical directions to selectively engage said cutter wheel with said tree stump.

8. The apparatus in accordance with claim 7, in which said handle bar means is adapted to be locked in a selected position upstanding from said arm.

9. The apparatus in accordance with claim 8, in which said handle bar means comprises a bar of a generally U-shaped configuration, ends of the bar being pivotally fixed to said arm with a loop portion extending upwardly from said arm.

10. The apparatus in accordance with claim 9, in which said handle bar means is provided with a bracket, a spring-biased plunger mounted on said bracket and extending through a hole in said handle bar means, a flange adjacent said bracket, a plurality of holes disposed in said flange, said holes being arranged arcuatly relative to the pivot mounting of said handle bar means, said holes being adapted to receive said plunger, whereby said handle may be positioned such that said plunger aligns with a selected one of said holes to enter said selected hole to lock said handle in a selected position.

* * * * *